United States Patent [19]

Morris et al.

[11] 4,323,144

[45] Apr. 6, 1982

[54] HYDRO-PNEUMATIC BRAKE ACTUATOR ARRANGED TO MAINTAIN A CONSTANT BRAKE SHOE CLEARANCE

[75] Inventors: Robert B. Morris, N. Huntingdon; Quentin T. Clemmons, Irwin, both of Pa.

[73] Assignee: American Standard Inc., Wilmerding, Pa.

[21] Appl. No.: 169,256

[22] Filed: Jul. 16, 1980

[51] Int. Cl.³ ............................................. F16D 65/54
[52] U.S. Cl. .............................. 188/196 A; 188/153 R
[58] Field of Search .......................... 60/543; 92/13.7; 188/52, 153 R, 196 A, 198

[56] References Cited

U.S. PATENT DOCUMENTS

| | | | |
|---|---|---|---|
| 3,837,443 | 9/1974 | Clemmons et al. | 188/196 A |
| 3,913,328 | 10/1975 | Shaffer | 188/153 R X |
| 4,068,746 | 1/1978 | Munechika | 188/196 A |

*Primary Examiner*—Duane A. Reger
*Attorney, Agent, or Firm*—G. J. Falce

[57] ABSTRACT

A hydro-pneumatic brake actuator having a friction element positionable by the power piston during the brake application stroke through a lost-motion connection therewith to establish a stop to limit movement of the power piston during a brake release and thereby provide a predetermined brake shoe clearance. In an alternate embodiment, a leaf spring is carried by the friction element to provide a cushioned stop for the power piston to prevent inadvertent displacement of the friction element, by reason of wheel out-of-roundness imparting a "kick-back" force on the power piston.

11 Claims, 2 Drawing Figures

HYDRO-PNEUMATIC BRAKE ACTUATOR ARRANGED TO MAINTAIN A CONSTANT BRAKE SHOE CLEARANCE

BACKGROUND OF THE INVENTION

The present invention relates to hydro-pneumatic actuator devices and particularly to brake actuators for railway vehicles operating in passenger transit service. These brake actuators may be either tread or disc brake units.

Typically, these brake units employ a light spring to bias the brake shoe into constant engagement with the wheel tread or disc during brake release, in order to generate, by friction, sufficient heat to prevent the accumulation of ice and snow on these brake parts during winter time and to assure a prompt response of the brakes. These so-called "zero-clearance" arrangements, in addition, offer the advantages of simple construction and accordingly low-cost manufacture.

Recent tests, however, have shown that the drag of the brake shoes during periods of brake release requires a considerable expenditure of train power, particularly where the train consists of more than one or two cars. With today's high cost of fuel, the consumption of power needed to overcome brake drag becomes increasingly critical and can offset any advantages heretofore realized.

SUMMARY OF THE INVENTION

The object of the present invention, therefore, is to provide a hydro-pneumatic actuator device for railway brake apparatus having a simple arrangement by which a constant brake shoe clearance is maintained throughout the range of brake shoe/wheel wear.

Another object of the invention is to eliminate the possibility of wheel out-of-round changing the constant clearance setting.

In the attainment of these objectives, the hydraulic power cylinder portion of a hydro-pneumatic brake actuator unit is arranged to incorporate a friction member that is engageable with the cylinder bore of the power cylinder portion and carries a central projection that extends into a cavity formed at the pressure end of the power piston that operates in the power cylinder bore. An inwardly directed flange is connected to the face of the power piston for engagement with a stop shoulder formed on the projection of the friction member, when the power piston is actuated in a brake application direction, in order to pull the friction member with the power piston, while establishing a predetermined distance therebetween. A return spring is caged between the power piston flange and a shoulder on the projection of the friction member to force the power piston in a brake release direction, when the brake actuating pressure on the face of the power piston is released. Since the friction member remains stationary during movement of the power piston in the brake release direction, the return stroke of the power piston is limited to the predetermined distance established between the power piston and friction member during the brake application stroke. This limited return stroke of the power piston thus establishes and maintains the clearance between the wheel tread or brake disc and the brake shoe to which the power piston is connected, as the brake shoe wears.

In an alternate embodiment of the invention, a leaf-type spring is carried by the friction member between the friction member and power piston, in spaced-apart relationship with the adjacent faces thereof. The leaf spring thus establishes the brake shoe clearance, while the spring deflection into the space between the leaf spring and friction member accomodates axial overtravel of the power piston, in the event the power piston is "kicked-back" by the action of the wheel (due to wheel out-of-round) an amount in excess of the predetermined brake shoe clearance. The leaf spring then returns the power piston to its normal release position and the predetermined brake shoe clearance is established.

BRIEF DESCRIPTION OF THE DRAWING

These objectives and other advantages of the invention will become apparent from the following more detailed explanation, when taken with the accompanying drawing in which.

DESCRIPTION AND OPERATION

Figure 1:
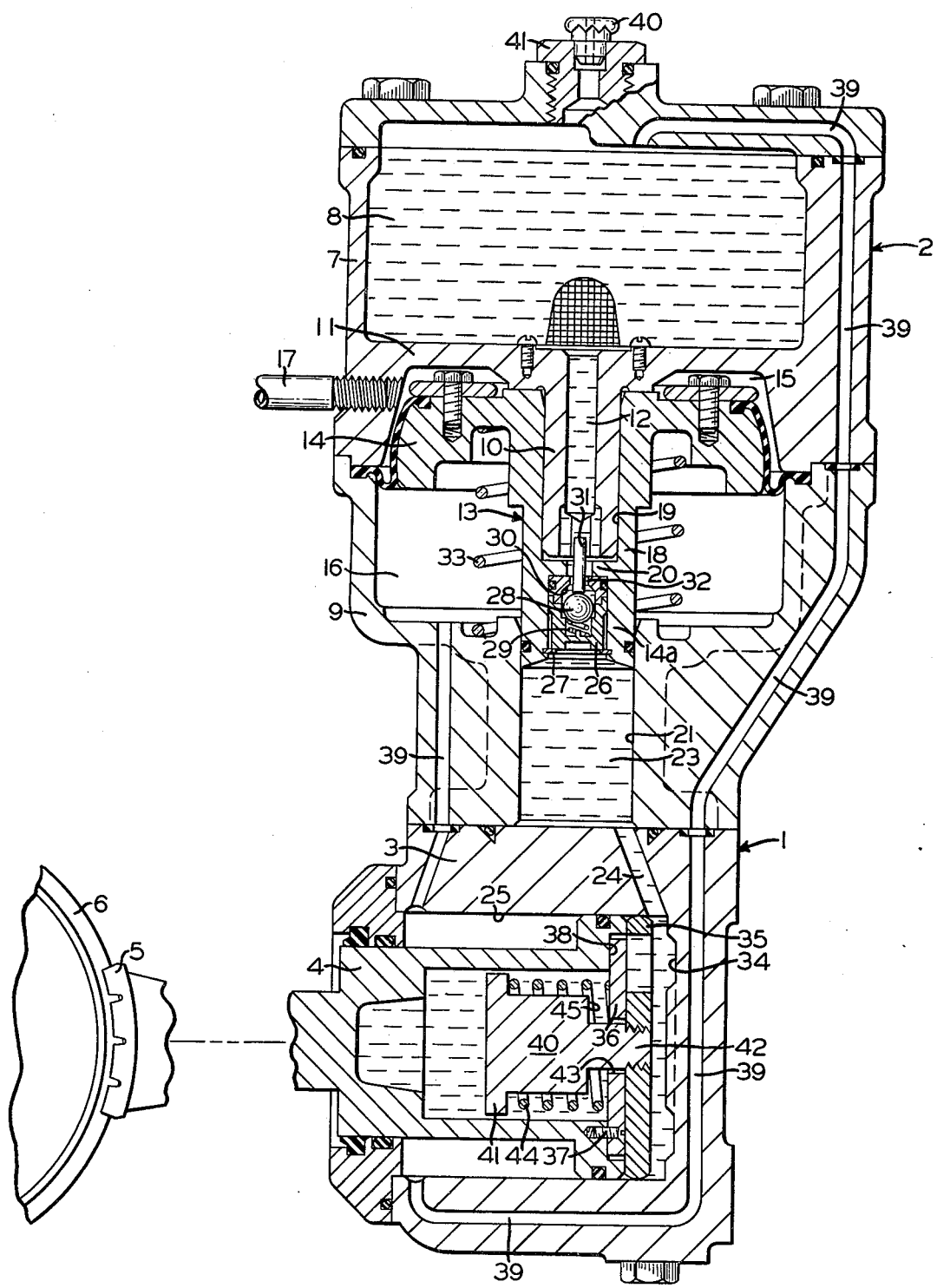
FIG. 1 is a sectional assembly view of a hydro-pneumatic brake actuator incorporating the present invention.

The brake unit embodying the present invention, as shown in FIG. 1, comprises a force actuator portion 1 and a hydropneumatic converter portion 2. The force actuator portion 1 includes a power cylinder 3 in which a power piston 4 is coaxially disposed for operation between a retracted or brake release position, and an applied position, as shown. In brake release position of piston 4, a brake shoe 5 suitably mounted in a conventional manner to piston 4, is spaced-apart from the tread of a wheel 6 of a railway vehicle on which the brake unit may be mounted. This clearance between brake shoe 5 and the wheel tread 6 is maintained constant over the wear life of the shoe and wheel tread, in accordance with the teachings of the present invention.

The hydro-pneumatic converter portion 2 is mounted to force actuator portion 1 in a vertical disposition relative thereto. Converter portion 2 includes an upper casing section 7 in which is formed a hydraulic reservoir 8, and a lower casing section 9 to which force actuator portion 1 is connected. Upper casing section 7 also forms a vertical guideway 10 that extends downwardly from a wall 11 forming the bottom of reservoir 8 toward casing section 9. A coaxial passage 12 in guideway 10 extends therethrough, so as to open at its upper end into reservoir 8.

A hydro-pneumatic converter unit 13 comprising an integral pneumatic control piston 14 and a hydraulic input piston 14a is arranged to operate vertically in converter portion 2 by telescopic-like operation on guideway 10, as hereinafter explained. Pneumatic control piston 14 is the diaphragm-type, the outer periphery of the piston diaphragm being sealingly clamped between the two casing sections 7 and 9. Pneumatic control piston 14, in cooperation with that portion of upper casing section 7 below separating wall 12, forms a pneumatic pressure control chamber 15 adjacent the upper-side of control piston 14. Formed below control piston 14 within lower casing section 9 is a spring chamber 16. Chamber 15 is connected via a supply pipe 17 to a source of pneumatic control pressure, and spring chamber 16 is vented to atmosphere via a fluid leakage recycling passage 39, that leads back to hydraulic reservoir 8 and a vented plug 40 of a fluid refill cap 41.

Projecting from the underside of piston 14 is a coaxial guide stem 18, the face of which forms hydraulic input piston 14a. Guide stem 18 is formed with a bore 19 extending therethrough and having a reduced diameter section 20 at approximately the axial midpoint of the bore 19, to divide the bore into upper and lower portions. The upper portion of piston bore 19 is sealingly mounted on guideway 10 to accommodate reciprocal movement of converter unit 13.

Input piston 14a is sealingly disposed in a cylinder bore 21 formed in lower casing section 9. Bore 21, along with hydraulic input piston 14a and the portion 1, to which the converter portion 2 is mounted, define a hydraulic pressure chamber 23 into which the lower portion of bore 19 of guide stem 18 opens. Hydraulic chamber 23 is connected by a passage 24 to a cylinder bore 25 in power cylinder 3 of force actuator portion 2.

Disposed in the lower portion of bore 19 of guide stem 18 is a cartridge-type check valve device 26 that is held in position against reduced diameter section 20 by a retainer ring 27. The check valve device comprises a ball valve 28 that is biased by a light spring 29 toward engagement with a tapered, annular seat 30. A spacer pin 31 integral with the bottom of guideway 10 projects through the reduced diameter section 20 of bore 19 and through an opening 32 in the top of check valve cartridge 26 to engage and unseat ball valve 28, when control piston 14 is fully retracted by a release spring 33 in chamber 16.

Disposed in cylinder bore 25 of power cylinder 3 between the face of power piston 4 and the cylinder end wall 34 is an annular friction ring 35 which has continuous frictional engagement with the cylinder bore 25. This frictional engagement of ring 35 with cylinder bore 25 is obtained by reason of the outer diameter of friction ring 35 being somewhat greater than the diameter of bore 25, whereby the axial position of ring 35 in bore 25 may be maintained, as hereinafter discussed. A piston plate 36 is secured, as by screws 37 about its periphery, to an annular recess 38 in the face of power piston 4. An axial projection 40 of friction ring 35 is formed with an outturned flange 41 at one end and a reduced section 42 at its opposite end, which is of such reduced diameter, as to pass through a central opening 43 in piston plate 36 for screw-threaded engagement with friction ring 35. Formed in the face of piston 4 is a hollow opening in which projection 40 is housed. A spring 44 is disposed between the outturned flange 41 and piston plate 36, to urge piston 4 into engagement with friction ring 35. A shoulder 45 formed by the reduced diameter section 42 of projection 40 is spaced-apart from piston plate 36 and engageable therewith during the brake application stroke of piston 4 to establish a lost-motion connection between piston 4 and projection 40 via which the position of friction ring 35 is established.

Figure 2:
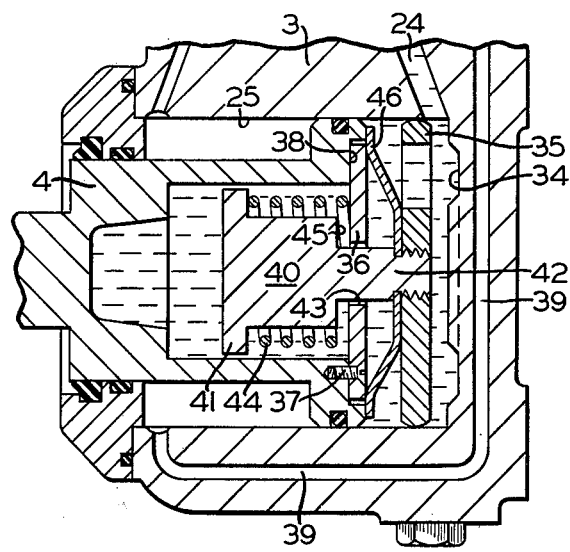
FIG. 2 is a partial, sectional assembly view of the brake actuator showing a variant of the invention.

In the embodiment of FIG. 2, a leaf spring 46 is clamped between friction ring 35 and the reduced diameter section 42 of projection 40. This leaf spring consists preferably of a plurality of radial legs, which are spaced-apart from the adjacent face of friction ring 35 at their outer periphery, and are of such strength as to limit the axial movement of power piston 4 in a release direction under the force exerted by spring 44.

Referring to FIG. 1, when a brake application is initialed, pneumatic pressure chamber 15 is supplied with pneumatic control fluid at a pressure commensurate with the degree of brake force desired, the manner in which this control fluid pressure is supplied being conventional and well known, and thus not deemed necessary for an understanding of the invention. With the face of pneumatic control piston 14 subjected to this control pressure supplied to chamber 15, converter unit 13 is moved downwardly against the opposing force of spring 33. Cartridge 26 is carried with converter unit 13, moving ball valve 28 away from engagement with spacer pin 31. This allows the ball valve to be forced into engagement with its seat 30 by spring 29, thereby interrupting fluid pressure communication between hydraulic reservoir 8 and hydraulic chamber 23 via passage 12. With ball valve 28 thus closed, the force of pneumatic pressure acting on the upper side of control piston 14 is transmitted via hydraulic input piston 14a to the hydraulic fluid trapped in hydraulic chamber 23 and thereby converted to hydraulic force. Because the effective pressure area of the upper surface of control piston 14 is much greater relative to the effective area of hydraulic input piston 14a, the force transmitted to the hydraulic fluid in chamber 23, and thus to power piston 4, is amplified according to the relative areas of the respective pistons.

The hydraulic pressure acting on the face of power piston 4 forces this piston in a leftward direction, to in turn force brake shoe 5 into brake engagement with the tread of wheel 6. Plate 36 is carried with piston 4, whereby spring 44 is compressed between plate 36 and flange 41 of projection 40, it being understood that projection 40 remains stationary by reason of friction ring 35 with which projection 40 is threadedly connected, having frictional engagement with bore 25 of cylinder 3. This relative movement provided by the lost-motion connection between piston 4 and projection 40 is limited to a predetermined amount, as defined by the distance between shoulder 45 and piston plate 36 and corresponds to the clearance between brake shoe 5 and the tread of wheel 6. When the brake shoe is frictionally engaged with wheel 6, plate 36 is concurrently engaged with shoulder 45 of projection 40.

In the event brake shoe/wheel wear occurs during brake shoe engagement with the wheel, piston 4 will move further leftward under the force of the hydraulic brake application pressure to maintain the desired brake force. This further movement of piston 4 causes piston plate 36 to move a distance in excess of the predetermined distance corresponding to the desired brake shoe clearance, thus also forcing projection 40 leftward by reason of overcoming the frictional engagement between the outer periphery of friction ring 35 with bore 25. Thus, any movement of piston 4 more than the predetermined distance corresponding to the desired brake shoe clearance results in displacement of friction ring 36 in a leftward direction in cylinder bore 25.

During subsequent release of the brakes, as by venting the pneumatic control pressure in chamber 15, to allow return spring 33 to retract converter unit 13, the hydraulic brake pressure in chamber 23 and effective on the face of power piston 4 is also relieved, thus allowing the compressed spring 44 to force power piston 4 in a rightward direction into engagement with friction member 35. This limits the return stroke of power piston 4 and thereby establishes the desired clearance between brake shoe 5 and wheel 6, irrespective of the degree of overtravel arising from brake shoe/wheel wear during a preceding brake application.

In order to admit "make-up" hydraulic fluid to hydraulic chamber 23 to compensate for any volumetric increase resulting from progressive advancement of power piston 4 in a brake application direction due to continued brake shoe/wheel wear over the life of the shoes, ball check valve 28 is unseated by the pressure differential created thereacross when the return stroke of power piston 4 is terminated, to establish hydraulic fluid communication between reservoir 8 and hydraulic chamber 23.

In the embodiment of FIG. 2, leaf spring 46 carried by friction member 35 serves as the limit stop for power piston 4, when the release stroke of the piston has covered a distance corresponding to the desired brake shoe/wheel clearance. In that the active part of spring 46 is spaced-apart from friction ring 35, any "kick-back" force imparted to piston 4 in a leftward direction during brake release by reason of out-of-roundness of wheel 6, sufficient to otherwise cause displacement of friction ring 35, is absorbed by spring 46. In absorbing this "kick-back" force, spring 46 is deflected at its outer periphery by engagement with piston 4, as the impact of piston 4 is absorbed. Following dissipation of the "kick-back" force, the impact energy stored by the spring is effective to force piston 4 in a rightward direction and thus must exert sufficient force to overcome the opposing force of spring 44. In this manner, spring 46 serves the dual purpose of establishing the limit stop for brake shoe clearance and also absorbing wheel forces tending to axially displace friction ring 35. Accordingly, this embodiment of the invention enhances the operation by positively maintaining the predetermined brake shoe/wheel clearance desired, even under adverse conditions of wheel out-of-roundness.

Having thus described the invention, what we claim as new and desire to secure by Letters Patent, is:

1. For use on a vehicle having a friction braking surface, a hydro-pneumatic brake actuator comprising:
(a) brake means for engaging said friction braking surface to brake said vehicle,
(b) a power actuator portion including:
   (i) a bore formed in the casing of said actuator portion; and
   (ii) a power piston operably connected with said brake means and coaxially disposed in said bore to form in cooperation therewith a first hydraulic chamber, said power piston being arranged to force said brake means in a brake application direction in response to the supply of fluid pressure to said first hydraulic chamber, to thereby effect engagement of said brake means with said friction braking surface;
(c) a converter portion including:
   (i) a casing having formed therein a second hydraulic chamber connected to said first hydraulic chamber, a reservoir in which said hydraulic fluid is stored, and a pneumatic control chamber;
   (ii) a hydro-pneumatic converter unit including:
      1. a control piston operatively disposed in said control chamber for actuation from a release position to an application position in response to the supply of pneumatic pressure thereto;
      2. a first return spring acting on said control piston to urge movement thereof toward said release position;
      3. an input piston integral with said control piston and operatively disposed in said second hydraulic chamber, to which the fluid in said reservoir is connected, to transmit fluid pressure from said second hydraulic chamber to said first hydraulic chamber in consequence of movement of said control piston from said release position toward said application position, thereby effecting said engagement of said brake means with said friction braking surface;

wherein the improvement comprises:
(d) a second return spring to urge said power piston toward a brake release position;
(e) friction means engageable with said bore and displaceable therealong to different axial positions, for providing a stop with which said power piston is engageable to accordingly establish said brake release position thereof; and
(f) a lost-motion connection between said power piston and said friction means via which said friction means is axially displaced along said bore in said brake application direction following movement of said power piston a predetermined distance in said brake application direction, whereby subsequent movement of said power piston in said brake release direction is limited by engagement with said stop following movement of said power piston said predetermined distance, to accordingly maintain a constant clearance between said brake means and said braking surface corresponding to said predetermined distance.

2. A hydro-pneumatic actuator, as recited in claim 1, wherein said friction means comprises an annular friction element that is engageable with said bore with such friction as to provide said stop.

3. A hydro-pneumatic actuator, as recited in claim 1, further comprising:
(a) said friction means including an annular friction element engageable with and displaceable along said bore; and
(b) spring means carried by said annular friction element for engagement with said power piston to provide said stop therefor, and to accommodate movement of said power piston a distance in excess of said predetermined distance, without effecting displacement of said annular friction element, when the force with which said power piston is returned to said brake release position exceeds the force exerted by said spring means.

4. A hydro-pneumatic actuator, as recited in claim 2 or 3 wherein said lost-motion connection comprises:
(a) said annular friction element having a projecting member fixed thereto and extending axially into a central opening formed in the face of said power piston;
(b) a first shoulder formed on said projecting member; and
(c) a piston plate fixed to said power piston so as to at least partially close said opening in the face thereof, said piston plate being axially spaced from said shoulder said predetermined distance in said release position of said power piston and engageable therewith upon movement of said power piston said predetermined distance in said brake application direction to establish the axial position of said stop.

5. A hydro-pneumatic actuator, as recited in claim 4, further characterized in that said second return spring acts between said piston plate and said projecting member.

6. A hydro-pneumatic actuator, as recited in claim 4, further comprising:
(a) a second shoulder formed on said projecting member; and (b) said second return spring acting between said piston plate and said second shoulder of said projecting member.

7. A hydro-pneumatic actuator, as recited in claim 2, further characterized in that said annular friction element engages said bore with such force as to prevent displacement thereof under the force of said second return spring exerted on said power piston upon engagement thereof with said annular friction element.

8. A hydro-pneumatic actuator, as recited in claim 3, further comprising:
(a) said friction means including:
  (i) an annular friction element engageable with and displaceable along said bore; and
  (ii) a projecting member fixed to said annular friction element so as to extend axially into a central opening formed in the face of said power piston; and
(b) a leaf spring having an annular inner portion engageable with said annular friction element in surrounding relationship with said projecting member, and a plurality of legs radiating from said annular inner portion in spaced-apart relationship with said annular friction element, so as to provide said stop for said power piston and to cushion said power piston by accommodating momentary movement thereof a distance in excess of said predetermined distance, thereby preventing displacement of said annular friction element during movement of said power piston to said release position.

9. A hydro-pneumatic actuator, as recited in claim 8, wherein said lost-motion connection comprises:
(a) a shoulder formed on said projecting member; and
(b) a piston plate fixed to said power piston so as to at least partially close said opening in the face thereof, said piston plate being axially spaced from said shoulder said predetermined distance in said release position of said power piston and engageable therewith upon movement of said power piston said predetermined distance in said brake application direction to establish the axial position of said stop.

10. A hydro-pneumatic actuator, as recited in claim 8, further characterized in that said annular friction element engages said bore with such force as to prevent displacement thereof under the reaction force of said leaf spring when deflected in response to said movement of said power piston a distance exceeding said predetermined distance, whereby said spring is effective to return said power piston to said release position.

11. A hydro-pneumatic actuator, as recited in claim 10, further characterized in that said annular friction element engages said bore with such force as to prevent displacement thereof by the reaction force exerted thereon by said leaf spring when deflected in response to said movement of said power piston a distance exceeding said predetermined distance.

* * * * *